(12) United States Patent
Benayoun et al.

(10) Patent No.: US 6,510,552 B1
(45) Date of Patent: Jan. 21, 2003

(54) APPARATUS FOR KEEPING SEVERAL VERSIONS OF A FILE

(75) Inventors: Alain Benayoun, Cagnes-sur-mer (FR); Jacques Fieschi, St-Laurent-du-Var (FR); Jean-François Le Pennec, Nice (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,193

(22) Filed: Jan. 28, 2000

(30) Foreign Application Priority Data

Jan. 29, 1999 (EP) .............................. 99480002

(51) Int. Cl.⁷ .............................. G06F 9/44; G06F 12/00
(52) U.S. Cl. ...................... 717/170; 717/168; 717/169; 707/203
(58) Field of Search .................. 717/170, 168–169, 717/171–178, 122, 110–113; 707/200–206, 509, 511; 711/221, 100

(56) References Cited

U.S. PATENT DOCUMENTS

| | | | | |
|---|---|---|---|---|
| 5,732,275 A | * | 3/1998 | Kullick et al. ............... | 717/170 |
| 5,778,390 A | * | 7/1998 | Nelson et al. ............... | 707/204 |
| 5,848,422 A | * | 12/1998 | Sato et al. .................. | 707/203 |
| 5,937,405 A | * | 8/1999 | Campbell .................... | 707/10 |
| 5,946,700 A | * | 8/1999 | Pongracz et al. ........... | 707/203 |
| 6,101,507 A | * | 8/2000 | Cane et al. .................. | 707/203 |
| 6,349,407 B1 | * | 2/2002 | Towfiq ........................ | 717/170 |
| 6,366,988 B1 | * | 4/2002 | Skiba et al. ................. | 707/203 |

OTHER PUBLICATIONS

Black et al. A Compact Representation for File Versions: A Preliminary Report. IEEE. 1989. pp. 321–329.*
Heckel. A Technique For Isolating Differences Between Files. ACM. 1978. pp. 264–268.*
Horwitz. Identifying the Semantic and Textual Differences Between Two Versions of a Program. ACM. 1990. pp. 234–245.q.*

* cited by examiner

Primary Examiner—Gregory Morse
Assistant Examiner—Wei Zhen
(74) Attorney, Agent, or Firm—Gail H. Zarick, Esq.; Mcginn & Gibb, PLLC

(57) ABSTRACT

An apparatus for keeping several versions of a file includes a memory and an overwriting unit coupled to the memory. An initial version of the file is stored in a first area of the memory, and a current version is stored in a second area of the memory, the current version resulting from a modification of the initial version. The overwriting unit substitutes the current version for the initial version in response to a validation signal. The validation signal is produced after the current version has been permanently stored.

20 Claims, 2 Drawing Sheets

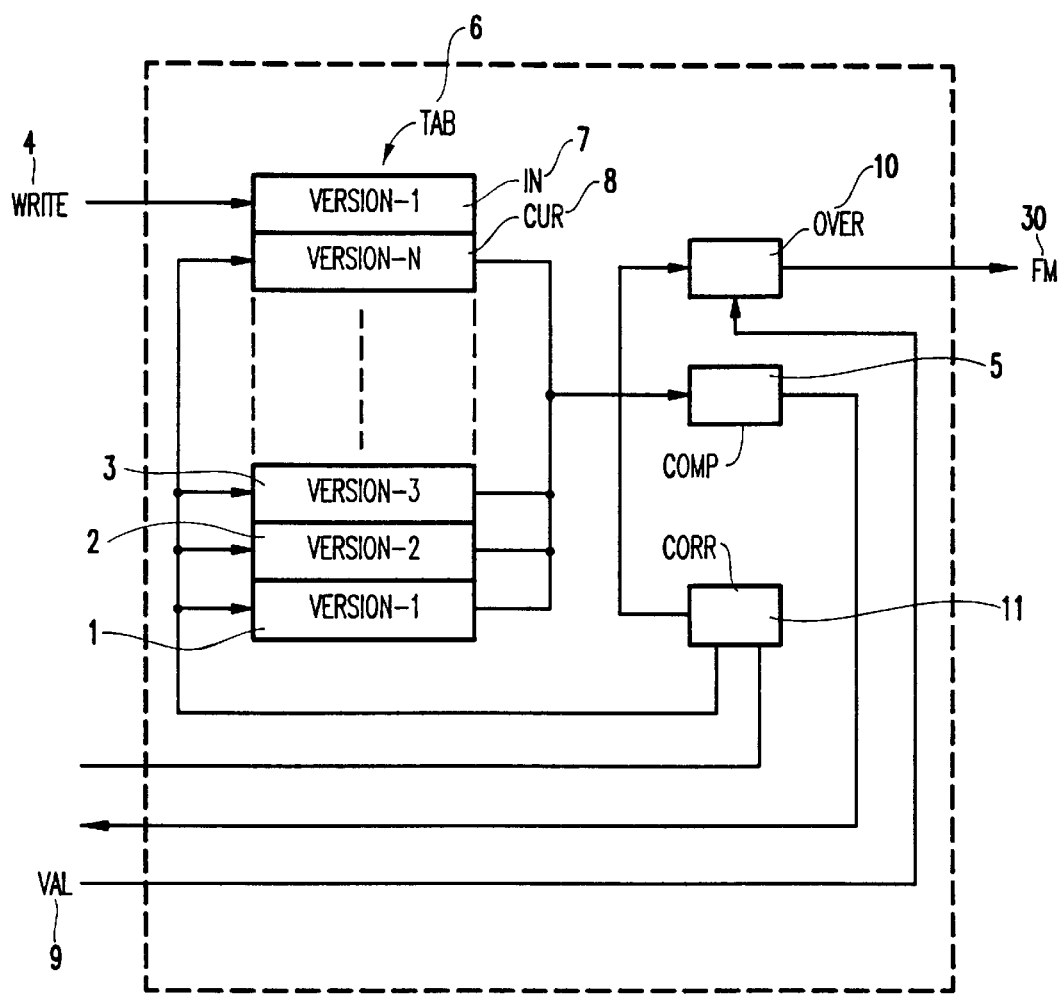

APPARATUS FOR KEEPING SEVERAL VERSIONS OF A FILE

BACKGROUND OF THE INVENTION

1. Field of the Invention

The present invention generally relates to computer systems and, more particularly, to an apparatus for keeping several versions of a file (e.g., user files and system files) in the computer's memory unit (e.g., disk drive).

2. Description of the Related Art

In a computer system, when a user needs to modify a file, the initial version of this file which is stored in a memory is put at his disposal. Then, the user can modify this version, thereby producing a current version. When the work is done, the user closes the file and the system typically asks him if he wants to save the current version. When the answer is "no", the current version is deleted. When the answer is "yes", the current version is substituted for the initial version. If the modification of the initial version (e.g., the current version) is not correct, it is not possible in conventional systems to come back to the initial version because it has been replaced. In fact, only one version is stored temporarily, and both versions are concurrently available exclusively during the modification.

At the present time, the only way to avoid this problem requires the user to make a copy of the initial version into another file prior to making any modification. This is not very user friendly and moreover, the user could easily forget to delete the duplicated file, which leads to unnecessary files occupying of the available memory space.

Recent computer systems generally come with a backup system. Such a system saves a defined set of files at regular time intervals, often during the night. But this system cannot solve the above-mentioned problem if the storing of the erroneous version and the creation of the initial version were both realized between two backup procedures. Furthermore, any file recovery from a backup recording is quite complex.

SUMMARY OF THE INVENTION

In view of the foregoing and other problems, disadvantages, and drawbacks of the conventional computer systems, an object of the present invention is to provide a structure and method for an apparatus which solves the drawbacks due to the storing of an erroneous version.

According to an embodiment of the invention, an apparatus is provided for keeping several versions of a file. An initial version (e.g., first version) of the file is stored in a first area (e.g., called "old area"), and a current version (e.g., second version) is stored in a second area (e.g., called "current area"), the second version being a modification of the initial version. The apparatus comprises an overwriting unit for substituting the current version for the initial version in response to a validation signal, and more specifically, the validation signal is produced after the current version has been permanently stored.

Thus, prior to any validation, both versions are available and it is possible to restore the initial version when the current version is erroneous.

In addition, for a further version resulting from a modification of the current version, the apparatus comprises a unit for storing the current version in a third area (e.g., called "history area") prior to this modification, this further version then becoming the current version. Advantageously, the apparatus comprises a correcting unit for replacing the current version by any previous version in response to a command.

Accordingly, the apparatus comprises an identification unit for identifying the current version prior to its replacement by the previous version. Moreover, the apparatus comprises a unit for deleting all versions stored in the history area in response to the validation signal. In one embodiment, the validation signal is an input signal.

Further, the apparatus may comprise a comparing unit for producing a comparison signal as a result of a comparison between the current version and another version. For instance, the validation signal corresponds to the comparison signal. Preferably, the apparatus comprises a unit for listing all versions.

In addition, the apparatus comprises a unit for restricting the number of versions stored in the history area. Likewise, the apparatus comprises a unit for deleting an identified version of the history area.

The present disclosure relates to subject matter contained in European Patent Application No. 99480002.7, filed Jan. 29, 1999, which is expressly incorporated herein by reference in its entirety.

BRIEF DESCRIPTION OF THE DRAWINGS

The foregoing and other objects, aspects and advantages will be better understood from the following detailed description of a preferred embodiment of the invention with reference to the drawings, in which:

FIG. 1 illustrates a first embodiment of the present invention;

FIG. 2 illustrates a second embodiment of the present invention; and

DETAILED DESCRIPTION OF PREFERRED EMBODIMENTS OF THE INVENTION

First Embodiment

Figure 3:
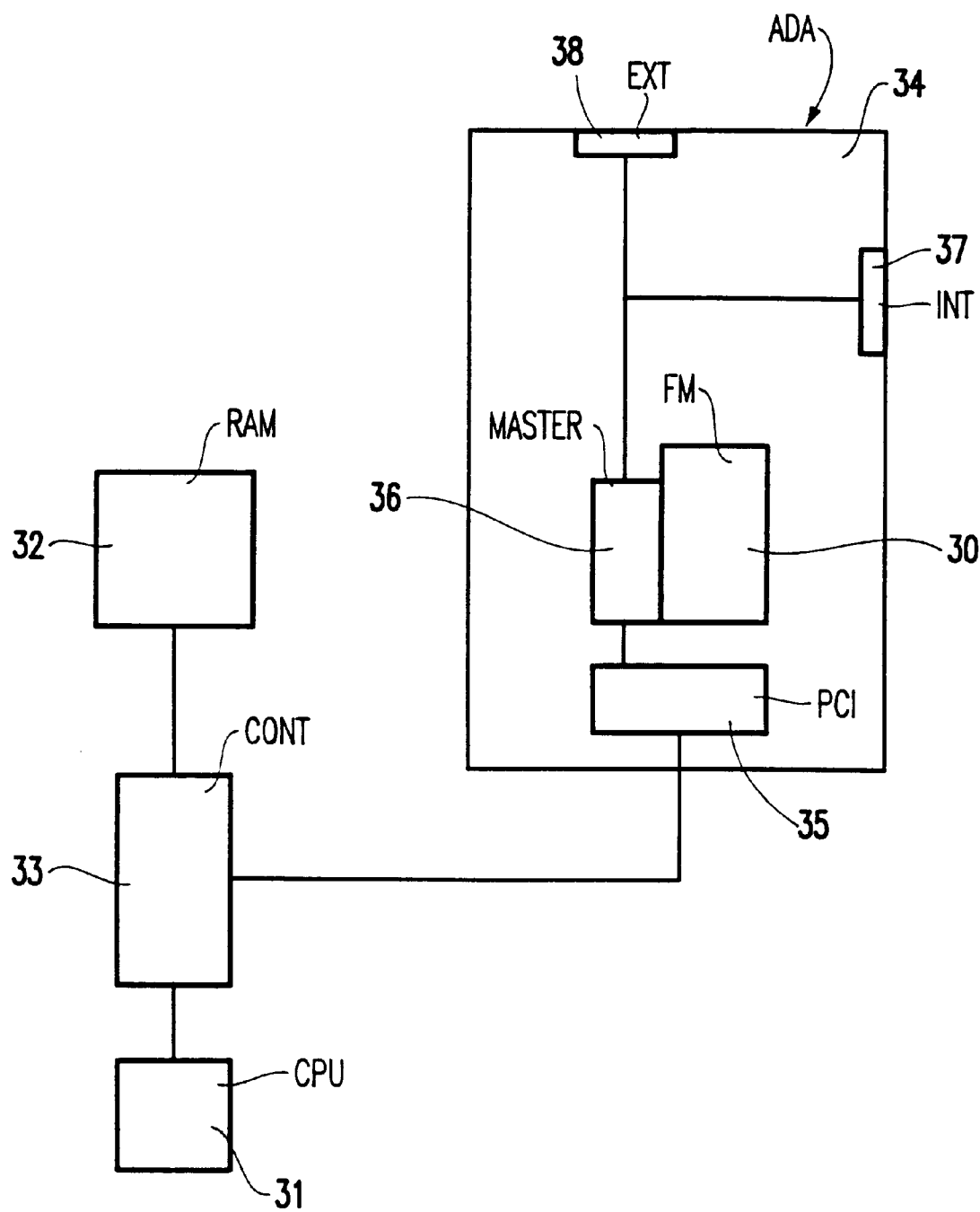
FIG. 3 shows a possible location for the apparatus according to the present invention.

A first embodiment will now be described with reference to FIG. 1. Let us consider a file whose initial version 1 is stored in a computer. In order to work on this file, a user first initiates a read operation and then a modification of the file will generate a write operation 4.

The apparatus object of the present invention is located upstream from the file manager 30 of the computer. It detects the write operation 4 and duplicates the initial version 1 on a second version 2 prior to writing the modification on version 2. Version 1 remains in its initial state without modification and version 2 is the modified initial version 1 subsequent to a writing operation.

Accordingly, this apparatus comprises means (e.g., a unit) for generating a file whose name is VERSION-2, different from an initial version with the name VERSION-1, and from all other files of the memory. These means will not be described further as they can easily be realized by one skilled in the art.

Additionally, the apparatus manages a table 6 having an input 7 which is file name VERSION-1 to which it associates an ordered list of names. Prior to the creation of the second version 2, this list, whose output 8 is arranged in chronological order with the most current version listed first, comprises only VERSION-1. When the second version 2 is created, it occupies the first place on the list and the file VERSION-1 is now in the second position on the list.

Thus, the initial version 1 is stored in a first memory area that is called "old area" and the second version 2 is stored in a second area that is called "current area". Both versions are permanently stored, which means that they are concurrently available.

When access to version 1 is required, the apparatus provides the first item 8 (e.g., version N) of the list as a file (e.g., version 2 in the case where there are only two files). When a user closes the file, two versions of this file are available (e.g., version 2 as a modified version and version 1 as an initial version). Later, the user will again modify this file. Accordingly, the user will have access to the second version 2 since this is the first item in the table.

A new modification of the file will initiate a duplication of the second version 2 in a third version 3, as described above. Concurrently, the apparatus sets version 3 at the top of the list. The list of file names is now VERSION-3, VERSION-2, VERSION-1 and consequently, the new modification is written on the third version 3.

Once three versions exist, a third memory area is defined, called "history area". The third version 3 is in the current area, the second version is in the history area, and the first (e.g., initial) version is in the old area. Each time a new modification of the file is made, a new version N is created and becomes the current version while the previous version (N−1) is transferred to the history area.

When a user believes that the current version is erroneous, and therefore wishes to return to a previous version, the user initiates a delete command. The apparatus receives this command and removes the first item 8 (e.g., the most recent) on the list, and deletes the current version N. The new current version is the preceding one, version N−1 (e.g., the next newest).

It is suitable to limit the number of items in the list associated with the file in view of memory capacity limitations. When the set limit is reached, the next to last item (e.g., in the case at hand, the file named VERSION-2), of the list is removed and the new version, the file named VERSION-N, is then at the top of the list. The first or initial version is always maintained.

Furthermore, it is necessary to periodically purge the list as it is useless to keep many versions of the same file when they were only created for security purposes.

For example, when access to the current version is made one day later than the previous access, the apparatus may query the user if the user wants to save this current version. A "yes" answer initiates a validation signal 9 to an overwriting unit 10 in the apparatus. Then, the current version N is substituted for the initial version and all but the last VERSION- 1 items of the list are deleted. Obviously, the corresponding versions 2, 3, . . . , N are also deleted.

Furthermore, the apparatus can also be provided with a unit for automatically upgrading the list. For instance, prior to storing the current version N, the automatic list upgrading unit can check whether its size is bigger than the size of the previous version (N−1) by means of a comparator 5 that produces a comparison signal. If the current version N is not larger, the apparatus then sends a warning to the user and, subject to the user action, it saves or does not save the current version.

According to an advantageous feature, the user can access the table in order to exchange any version of the history area or the initial version with the current version by generating a command intended for a correcting unit 11 in the apparatus. Preferably, the apparatus is provided with an identification unit for identifying the version which is shifted with a flag.

Second Embodiment

With reference to FIG. 2, a second embodiment will now be described wherein the present invention is implemented in the file manager 30 of a computer.

The file manager 30 shows where a file which is commonly identified by a path is physically located. Such a path includes a logical unit 20, a directory 21 and a file name 22. The logical unit 20 is generally referenced by a capital letter followed by a colon (e.g., C:). A directory 21 gathers several files that have common characteristics. A classification is thus defined for the plurality of files linked to the same logical unit 20.

Furthermore, a directory 21 can be subdivided in subdirectories, which can themselves be subdivided into sub-subdirectories, and so on. The term "directory" will now be used with its generic meaning, (e.g., referring to the whole hierarchy of the classification).

Finally, a file has a file name 22 (e.g., FILE1). When FILE1 belongs to the directory 21 (E.G., DIR1) linked to logical unit 20 (e.g., "C:"), it is identified by the path C:\DIR1\FILE1. The directory 21 and the file name 22 represent an identifier which means that FILE1 is identified by a logical unit C: and the identifier \DIR1\FILE1.

Additionally, files are often provided with attributes 23. For example, R for read, which means that this file can be read, W for write, which means that this file can be written or modified, H for hide, when the involved file should not be accessed, and X for execute, when the involved file is a program that can be executed.

Files are stored on physical units 24 (e.g., disks). Using the file C:\DIR1\FILE2, as shown in FIG. 2, as an example, a first version 1 of this file is stored on physical unit 3Z (e.g., the so-called "old area"). Later, a second version 2 of file C:\DIR1\FILE2 is produced further to a modification of the initial version and it is stored on physical unit 2Y (e.g., the so-called "current area").

The file manager 30 comprises a table which shows that this file has a READ attribute associated with a priority list of physical units 3Z, 2Y, respectively corresponding to versions 1 and 2, and that it has a WRITE attribute associated with a priority list of physical units 2Y, 3Z respectively corresponding to versions 2 and 1 of this file. When a read operation is initiated, the file manager 30 will first select the corresponding file in physical unit 3Z. If this file is not available, the file manager 30 will then look for the version stored in physical unit 2Y.

Similarly, when a write operation is initiated, the file manager 30 will first select the corresponding file in physical unit 2Y. If this file is not available, the file manager 30 will then look for the version stored in physical unit 3Z. Accordingly, the file C:\FILE2 is read in physical unit 3Z and when it is modified, it is stored in physical unit 2Y. It follows that two versions of the same file are available (e.g., the first one on physical unit 3Z and the second one with the modifications on physical unit 2Y).

Usually, the second version 2, which is saved on physical unit 2Y, is the version required for further use. It is then necessary to reverse the priority list for the read attribute which then becomes 2Y, 3Z in order to be able to read this version. Consequently, the priority list for the write attribute should also be reversed.

Nevertheless, when reading the second version 2, it could appear that this version is erroneous because the modifications of the first version 1 should not have been made. It is therefore necessary to restore the first version 1. This is done by again reversing both priority lists which recover their initial states, 3Z, 2Y for the read attribute R and 2Y, 3Z for the write attribute W.

The above example deals with only two versions of a file, using two different attributes for these two versions. Obviously, it is still possible in this embodiment to manage many of versions, as in the first embodiment. In this case, each modification leads to the creation of a new version provided with a write attribute W, all previous versions being saved with a read attribute R.

With reference to FIG. 3, there is shown a possible location where the apparatus can be located. This holds for any embodiment, due to the fact that this apparatus can be considered as part of the file manager 30. This file manager 30 is implemented in equipment such as a personal computer, a workstation or a server.

The equipment essentially comprises a central processor unit (CPU) 31 and a random access memory (RAM) 32, each one connected to a first controller 33. First controller 33 is provided for controlling the bus and the memory 32 is further connected to an adapter 34 by a bus generally referred to as PCI (Peripheral Component Interconnect) bus 35.

The adapter 34 is preferably a Small Computer System Interface (SCSI) adapter, which is an ANSI standard. This standard defines a bus and the logical interfaces associated to this bus for interconnecting computers and peripheral devices. This adapter 34 is therefore provided with a PCI interface connected to the PCI bus 35 and to a second controller 36 in charge of controlling the peripheral devices. The second controller 36 is also connected by a SCSI bus to an internal interface 37 and to an external interface 38. The disk drives of the computer are connected to the internal interface while the external interface is used for external connection, to a network for instance.

Preferably, the file manager 30 is incorporated in the second controller 36. Alternatively, the file manager 30 can be implemented as a function of the operating system of the computer. Thus, the table, which contains the location and attributes of each file, is stored in the hard disk drive. This table may be duplicated in the memory RAM for performance improvement.

The scope of the present invention is in no way limited to the above embodiments. In particular, any means could be replaced by equivalent means.

While the invention has been described in terms of preferred embodiments, those skilled in the art will recognize that the invention can be practiced with modification within the spirit and scope of the appended claims.

What is claimed is:

1. An apparatus for keeping a plurality of versions of a file, comprising:
a memory for storing said plurality of versions of said file, said plurality of versions comprising an initial version of said file being stored in a first area of said memory, and a current version being stored in a second area of said memory, said current version resulting from a modification of said initial version; and
an overwriting unit for substituting said current version of said file for said initial version of said file in response to a validation signal,
wherein said validation signal is produced after said current version has been permanently stored, and
wherein said plurality of versions of said file are stored in a same database with a same file name and a same logical file path.

2. The apparatus according to claim 1, wherein a further version of said plurality of versions results from a modification of said current version, said apparatus further comprising:
a storing unit for storing said current version in a third area of said memory prior to said modification, said further version then becoming the current version.

3. The apparatus according to claim 2, further comprising:
a corrector for replacing the current version by any previous version in response to a command.

4. The apparatus according to claim 2, further comprising:
a deletor for deleting all versions stored in said third area in response to said validation signal.

5. The apparatus according to claim 2, further comprising:
a comparator for producing a comparison signal as a result of a comparison between said current version and another version.

6. The apparatus according to claim 2, further comprising:
a restricting unit for restricting the number of versions stored in said third area.

7. The apparatus according to claim 2, further comprising:
a deleting unit for deleting an identified version of said third area.

8. The apparatus according to claim 1, further comprising:
a corrector for replacing the current version by any previous version in response to a command.

9. The apparatus according to claim 8, further comprising:
an identification unit for identifying said current version prior to its being replaced by said previous version.

10. The apparatus according to claim 1, wherein said validation signal comprises an input signal.

11. The apparatus according to claim 10, wherein said validation signal corresponds to said comparison signal.

12. The apparatus according to claim 11, further comprising:
a deleting unit for deleting an identified version of a third area.

13. The apparatus according to claim 1, further comprising:
a comparator for producing a comparison signal as a result of a comparison between said current version and another version.

14. The apparatus according to claim 1, further comprising:
a list for listing all of said plurality of versions.

15. A file manager of a computer system, including the apparatus according to claim 1.

16. A controller of peripheral devices in a computer system, including the file manager of claim 15.

17. An operating system of a computer system, including the file manager of claim 15.

18. An apparatus for keeping a plurality of versions of a file, comprising:
means for storing said plurality of versions of said file, said plurality of versions comprising an initial version of said file being stored in a first area of said storing means, and a current version being stored in a second area of said storing means, said current version resulting from a modification of said initial version; and
means for substituting said current version for said initial version in response to a validation signal,
wherein said validation signal is produced after said current version has been permanently stored, and wherein said plurality of versions of said file are stored in a same database with a same file name and a same logical file path.

19. A method for keeping a plurality of versions of a file, said method comprising:

duplicating an initial version of a file;

storing permanently said initial version of said file in a first area of a memory;

storing permanently a current version, resulting from said duplicating, in a second area of said memory; and producing a validation signal after said current version has been permanently stored, wherein said plurality of versions of said file are stored in a same database with a same file name and a same logical file path.

20. The method according to claim 19, further comprising:

managing a table listing names and versions of said file.

* * * * *